(12) United States Patent
Hoshii (10) Patent No.: US 9,283,753 B2
(45) Date of Patent: Mar. 15, 2016

(54) PRINT CONTROL DEVICE AND PRINTER ADJUSTING METHOD

(71) Applicant: SEIKO EPSON CORPORATION, Tokyo (JP)

(72) Inventor: Jun Hoshii, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/574,793

(22) Filed: Dec. 18, 2014

(65) Prior Publication Data

US 2015/0174911 A1 Jun. 25, 2015

(30) Foreign Application Priority Data

Dec. 19, 2013 (JP) ................................. 2013-263028

(51) Int. Cl.
*B41J 29/38* (2006.01)
*B41J 2/07* (2006.01)
*B41J 2/21* (2006.01)
*G06K 15/10* (2006.01)

(52) U.S. Cl.
CPC *B41J 2/07* (2013.01); *B41J 2/2132* (2013.01); *G06K 15/107* (2013.01)

(58) Field of Classification Search
USPC .................... 347/12, 14, 15, 19, 5, 9; 358/1.2
See application file for complete search history.

(56) References Cited

U.S. PATENT DOCUMENTS

| 8,668,299 | B2 | 3/2014 | Tanase et al. |
| 8,864,256 | B2 | 10/2014 | Azuma et al. |
| 2009/0160895 | A1* | 6/2009 | Matsuzawa ..................... 347/12 |
| 2012/0274949 | A1* | 11/2012 | Masuda et al. ................. 358/1.2 |

FOREIGN PATENT DOCUMENTS

| JP | 2012-006259 A | 1/2012 |
| JP | 2012-171140 A | 9/2012 |

* cited by examiner

*Primary Examiner* — Lam Nguyen
(74) *Attorney, Agent, or Firm* — Maschoff Brennan (57) ABSTRACT

A print control device includes: a control section that controls a print head that includes first nozzles and second nozzles, wherein the control section causes a first region that is expressed by liquid ejected only by the first nozzles, a second region that is expressed by the liquid ejected from the first nozzles and the second nozzles depending on a first usage rate of the first nozzles and the second nozzles, and a third region that connects the first region and the second region, and is expressed by the liquid ejected from the first nozzles and the second nozzles depending on a second usage rate to be printed onto a printing medium, and wherein the second usage rate is a value that is obtained by increasing a usage rate of the second nozzles from a first region side to a second region side.

7 Claims, 8 Drawing Sheets

FIRST REGION SIDE

| 1 | 1 | 0 | 1 | 1 | 1 | 1 |
|---|---|---|---|---|---|---|
| 1 | 1 | 1 | 0 | 1 | 0 | 1 | 1 |
| 0 | 1 | 0 | 1 | 0 | 1 | 1 | 1 |
| 1 | 0 | 1 | 0 | 1 | 0 | 1 | 0 |

SECOND REGION SIDE

FIG. 5B

FIRST REGION SIDE

| 1 | 1 | 0 | 1 | 1 | 1 | 1 |
|---|---|---|---|---|---|---|
| 1 | 1 | 1 | 0 | 1 | 0 | 1 | 1 |
| 1 | 1 | 0 | 1 | 0 | 0 | 1 | 1 |
| 1 | 1 | 0 | 0 | 1 | 0 | 1 | 0 |

SECOND REGION SIDE

FIG. 5C

FIRST REGION SIDE

| 1 | 1 | 0 | 1 | 1 | 1 | 1 |
|---|---|---|---|---|---|---|
| 1 | 1 | 1 | 0 | 0 | 1 | 1 |
| 1 | 1 | 1 | 1 | 0 | 0 | 0 | 1 |
| 1 | 1 | 0 | 0 | 0 | 0 | 1 | 1 |

SECOND REGION SIDE

THERE IS NO POSITIONAL DEVIATION  THERE IS POSITIONAL DEVIATION

FIG. 7B

THERE IS NO POSITIONAL DEVIATION  THERE IS POSITIONAL DEVIATION

FIG. 8

PRINT CONTROL DEVICE AND PRINTER ADJUSTING METHOD

CROSS-REFERENCE TO RELATED APPLICATIONS

This application claims priority to Japanese Patent Application No. 2013-263028 filed on Dec. 19, 2013. The entire disclosure of Japanese Patent Application No. 2013-263028 is hereby incorporated herein by reference.

BACKGROUND

1. Technical Field

The present invention relates to a print control device and a printer adjusting method.

2. Related Art

A printer has been known which includes a print head having a first nozzle column in which first nozzles ejecting ink are arranged in a predetermined direction and a second nozzle column in which second nozzles ejecting the ink are arranged in the predetermined direction and are provided in a position deviated from the first nozzle column. In the printer, printing is performed by ejecting the ink from each nozzle to a printing medium that is transported in the predetermined direction.

Furthermore, a liquid ejecting apparatus has been known which includes a first nozzle column in which first nozzles are arranged in a predetermined direction, a second nozzle column in which second nozzles are arranged in the predetermined direction, and a control section that causes liquid to be discharged from the first nozzle column and the second nozzle column depending on dot data representing a dot size converted from input image data. The control section causes the liquid to be discharged from the first nozzles depending on the dot data obtained by performing a halftone process after multiplying a usage rate of the first nozzle column by incidence data for each dot size in an overlapping region between the first nozzle column and the second nozzle column, and causes the liquid to be discharged from the second nozzles depending on the dot data obtained by performing the halftone process after multiplying a usage rate of the second nozzle column by incidence data for each dot size in the overlapping region (see JP-A-2012-171140).

In the printer having such a configuration, when a region of the printing medium passes through under the second nozzle column, the ink can be ejected from the second nozzles to the region and when the region thereof passes through under the first nozzle column, the ink can be ejected from the first nozzle to the region. However, in a structure of the printer, it may not be possible to eject the ink from each of the nozzles (in the above example, the first nozzle of the first nozzle column and the second nozzle of the second nozzle column) for each of a plurality of nozzle columns as described above to an entirety of a printable region in the printing medium. In other words, even if the printer includes the plurality of nozzle columns as described above, a region onto which the ink is ejected only by one nozzle column among them may occur on the printing medium.

In product manufacturing, it is difficult to make ink ejection characteristics (a size or a weight for each of ink droplets that are ejected) of the first nozzles belonging to the first nozzle column and the ink ejection characteristics of the second nozzles of the second nozzle column be strictly identical to each other. Thus, for example, there is a concern that a difference in color values occurs in a printing result between a region in which the ink can be ejected only by the first nozzles of the first nozzle column and a region in which the ink can be ejected by the nozzles of each nozzle column. Furthermore, the difference in the color value is particularly noticeable and it may cause degradation of evaluation of image quality in an adjacent portion of two regions in which the nozzle columns that can be used to eject the ink are different from each other as described above. Moreover, in JP-A-2012-171140, it is not intended that the degradation of the image quality due to the difference between regions in which the nozzle columns that can be used to eject the ink are different from each other as described above be improved.

SUMMARY

An advantage of some aspects of the invention is to provide a print control device that is effective in improving image quality of a printing result and a printer adjusting method.

According to an aspect of the invention, a print control device including: a control section that controls a print head that includes a first nozzle column in which first nozzles ejecting liquid are arranged in a predetermined direction and a second nozzle column in which second nozzles ejecting the liquid are arranged in the predetermined direction and which is provided in a position deviated from the first nozzle column in the predetermined direction, and causes the liquid to be ejected onto a printing medium transported in the predetermined direction. The control section causes a first region that is expressed by the liquid ejected only by the first nozzles, a second region that is expressed by the liquid ejected from the first nozzles and the second nozzles depending on a first usage rate of the first nozzles and the second nozzles, and a third region that connects the first region and the second region, and is expressed by the liquid ejected from the first nozzles and the second nozzles depending on a second usage rate different from the first usage rate to be printed onto the printing medium. The second usage rate is a value that is obtained by increasing a usage rate of the second nozzles from a first region side to a second region side.

In this case, the control section is provided to have the third region that is printed by the first nozzles and the second nozzles between the first region that can be printed only by the first nozzles and the second region that is printed by the first nozzles and the second nozzles. Furthermore, the usage rate (the second usage rate) of the first nozzles and the second nozzles when printing the third region is obtained by the value by increasing the usage rate of the second nozzles from the first region side to the second region side. Thus, it is difficult for a user to recognize a difference in a color value between the first region and the second region by interposing the third region therebetween, therefore, the image quality is improved (evaluation for a print result is improved).

In the print control device, the control section may divide print data into a first print data corresponding to the first nozzles and second print data corresponding to the second nozzles by applying a mask that defines a correspondence relationship between each pixel position in the print data and one of the first nozzles or the second nozzles which are used to eject the liquid depending on the second usage rate to the print data generated based on input image data, and may cause the third region to be printed by ejecting the liquid from the first nozzles based on the first print data and by ejecting the liquid from the second nozzles based on the second print data.

In this case, it is possible to easily and reliably print the third region by applying the mask to the print data.

In the print control device, the mask may be a mask that defines arrangement of pixels corresponding to the first nozzles and pixels corresponding to the second nozzles so as to have predetermined constancy or greater in a change in a color value in the third region from the first region to the second region.

In this case, in the third region, since the color value is substantially changed at a constant rate from the first region side to the second region side, the differences in the color value between the first region and the second region are smoothly formed and it is possible to improve the evaluation of the image quality by the user.

Deviation occurs in landing positions on the printing medium between the liquid ejected from the first nozzle column and the liquid ejected from the second nozzle column. In a degree of such positional deviation, there is dispersion for each print head that is mass-produced. In the third region, the usage rate of the second nozzles is increased from the first region side to the second region side. Thus, ideally, the color value in the third region should be smoothly changed from the color value equivalent to the first region to the color value equivalent to the second region from the first region side to the second region side. However, if the positional deviation described above exists, such an ideal change in the color value fails in the third region. The inventors of the invention have discovered that the failure of the change in the color value is suppressed by relatively lowering the degree of the dispersion of the liquid ejected from the second nozzles in the third region.

Therefore, in the print control device, the mask may be a mask in which a degree of dispersion of the pixels corresponding to the second nozzles is lower than a first degree of the dispersion when the degree of the dispersion of the pixels corresponding to the second nozzles is the first degree of the dispersion when the pixels corresponding to the second nozzles are not adjacent to each other even in one of a first direction in which pixels are arranged and a second direction orthogonal to the first direction.

In this case, the failure of the change in the color value described above is suppressed and the color differences between the first region and the second region are smoothly formed and it is possible to improve the evaluation of the image quality by the user.

In the print control device, the control section may divide print data into the first print data corresponding to the first nozzles and the second print data corresponding to the second nozzles by applying the mask to the print data that expresses a predetermined test pattern and executes multiple times a process of printing the test pattern onto the printing medium by applying a plurality of masks in which degrees of the dispersion of the pixels corresponding to the second nozzles are different from each other by ejecting the liquid from the first nozzles based on the first print data and ejecting the liquid from the second nozzles based on the second print data. The control section may acquire a color measurement result of the test pattern that is printed for each of the test patterns in which the applied masks are different from each other and may analyze a degree of change in the color values for each of the test patterns. The control section may specify the mask applied to the printing of the test pattern having a predetermined constancy or more applied to the change in the color value, based on a result of the analysis. The control section may set the specified mask as a mask that is used to print the third region.

In this case, it is possible to set the mask that is suitable for the suppression of the failure of the change in the color value described above as the mask that is used to print the third region.

In the print control device, the control section may set the mask in which the degree of the dispersion is the highest among the specified plurality of masks as the mask that is used to print the third region when the plurality of masks applied to the printing of the test patterns having a predetermined constancy or more in the change in the color values are specified.

In this case, it is possible to set the mask that suitable for suppression of failure of the change in the color value described above for improvement of graininess as the mask that is used to print the third region.

In the print control device, the control section may set a length of the third region in the predetermined direction depending on a difference in the color value between the first region and the second region.

In this case, it is possible to provide the third region having an optimal length for the improvement of the image quality depending on a difference in color value between the first region and second region.

Technical ideas of the invention may be implemented in various categories such as a method, a computer program, and a computer-readable recording medium storing the program in addition to the print control device described above.

Furthermore, it is also possible to grasp the invention as a process for setting the mask suitable for the improvement of the image quality. As an example of this case, it is possible to grasp a printer adjusting method that adjusts a printer including a print head that has a first nozzle column in which first nozzles ejecting liquid are arranged in a predetermined direction and a second nozzle column in which second nozzles ejecting the liquid are arranged in the predetermined direction and which is provided in a position deviated from the first nozzle column in the predetermined direction, and ejecting the liquid onto a printing medium transported in the predetermined direction, the method including: acquiring a mask that acquires a first mask which defines a correspondence relationship between each pixel position in print data and one of the first nozzles and the second nozzles which are used to eject the liquid depending on a specific usage rate between the first nozzles and the second nozzles, and in which the specific usage rate is a value obtained by increasing the usage rate of the second nozzles from one side to the other side in a direction in which the pixels are arranged corresponding to the predetermined direction; printing a test pattern that prints the test pattern onto the printing medium by dividing the print data into first print data corresponding to the first nozzles and second print data corresponding to the second nozzles by applying the first mask to the print data expressing a predetermined test pattern, and by ejecting the liquid from the first nozzles based on the first print data and by ejecting the liquid from the second nozzles based on the second print data; analyzing a degree of change in color values of the test pattern by acquiring a color measurement result of the printed test pattern; and setting the mask that sets to the printer the first mask or a second mask which defines a correspondence relationship between each pixel position and one of the first nozzles and the second nozzles depending on the specific usage rate and of which a degree of the dispersion of the pixels corresponding to the second nozzles is higher than that of the first mask when it is determined that a predetermined constancy or more is provided in the change in the color values according to the analyzed result, and sets to the printer a third mask which defines the correspondence relationship between each pixel position and one of the first nozzles or the second nozzles depending on the specific usage rate and of which the degree of the dispersion of the pixels corresponding to the second nozzles is lower than that of the first mask when it is determined that a predetermined constancy or more is not provided in the change in the color values.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
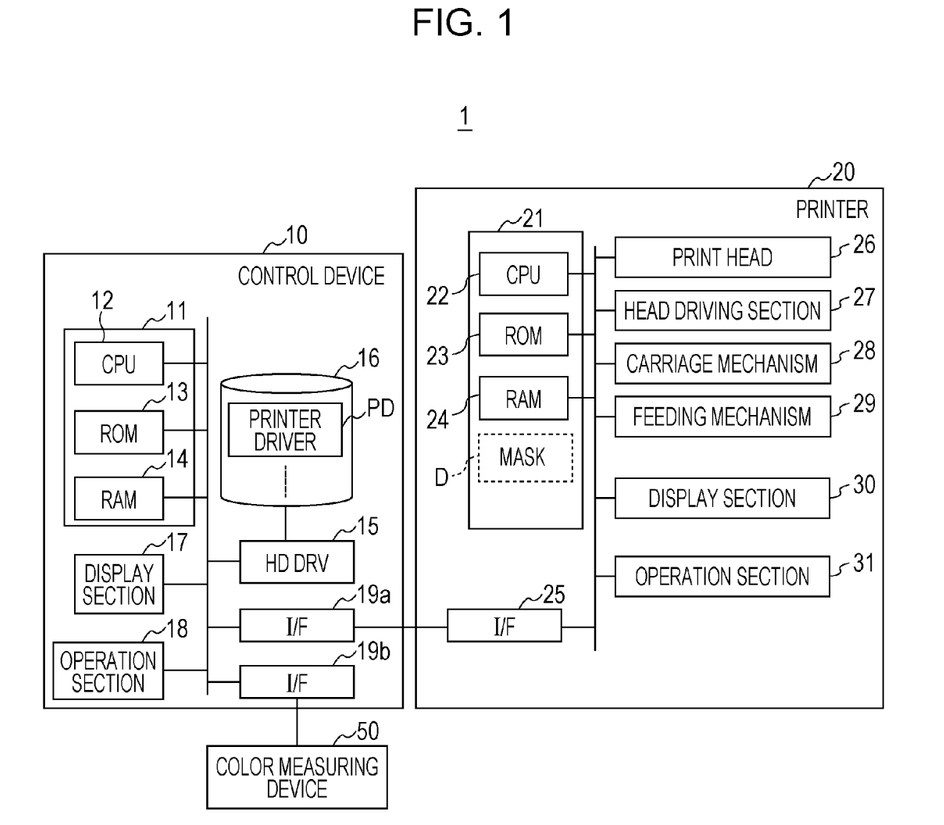
FIG. 1 is a view schematically illustrating an apparatus configuration according to an embodiment.

An embodiment of the invention will be described according to the following order.
1. Overview of Apparatus Configuration
2. Printer Adjusting Method
3. Print Control Process with Application of Set Mask
4. Modification Examples 1. Overview of Apparatus Configuration FIG. 1 schematically illustrates a configuration of a print control system 1 according to the embodiment. The print control system 1 has a printer 20 and a print control device (control device 10) for controlling the printer 20. The control device 10 is a device that is equipped with a program for controlling the printer 20 and a main execution body of a printer adjusting method. The control device 10 is typically a personal computer (PC) of a type of desktop or laptop, but may be a tablet terminal, a mobile terminal, or the like. The print control system 1 may include a color measuring device 50. The color measuring device 50 is a device for measuring the color of a printing medium on which an image is printed and corresponds to a colorimeter, an image reading device (scanner), or the like.

The control device 10, the printer 20, and the like configuring the print control system 1 may be individual devices that are communicably connected and may configure a product in which the devices are provided together. For example, the printer 20 may include the control device 10 in a part of a body thereof. In this case, the printer 20 including the print control device 10 in the body thereof corresponds to the print control system 1 or the print control device and is the main execution body of the printer adjusting method. Furthermore, the printer 20 corresponds to the print control system 1 or the print control device may be a multifunction device further including the scanner.

In the printer adjusting method of the embodiment, a mask D that is most suitable for printing of a transition region described below is set to the printer 20. Setting of the mask D may be performed on a manufacturer side before the printer 20 is shipped and may be performed on a side of the user owning the printer 20 after the printer 20 is shipped. In a case where the control device 10 and the printer 20 are individual devices, if the setting of the mask D is performed before the printer 20 is shipped, a control device for controlling the printer 20 (the printer 20 after shipment) after the mask D is set exists on the user side apart from the control device 10 that is used for setting the mask D. In order to simplify the following description, the control device for controlling the printer 20 after the mask D is set is assumed as the control device 10 as well as the control device that is used for setting the mask D.

In the control device 10, a CPU 12 forming the center of a calculating process controls an entirety of the control device 10 through a system bus. A ROM 13, a RAM 14, and various interfaces (I/F 19a, 19b, and the like) are connected to the bus and a hard disk (HD) 16 as a storage unit is connected to the bus through a hard disk drive (HD DRV) 15. An operating system, an application program, a printer driver PD, and the like are stored in the HD 16, and such programs are appropriately read and executed by the CPU 12 in the RAM 14. The CPU 12, the ROM 13, and the RAM 14 are collectively referred to as a control section 11. The I/F 19a is connected to the printer 20 and the I/F 19b is connected to the color measuring device 50. Furthermore, the control device 10 includes a display section 17 that is, for example, configured of a liquid crystal display, an operation section 18 that is, for example, configured of a keyboard, a mouse, a touch pad, or a touch panel, and the like.

Figure 2:
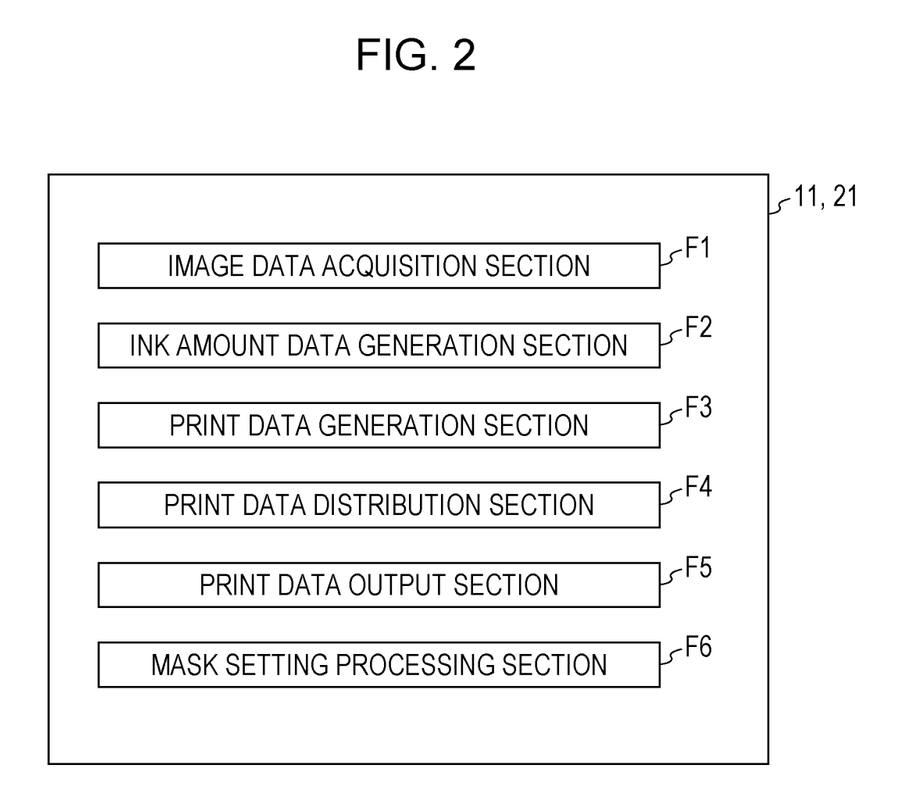
FIG. 2 is a block view illustrating a function that is implemented by a control section.

FIG. 2 illustrates each function to be implemented by a process in the control section 11 according to a printer driver PD. According to FIG. 2, the control section 11 has an image data acquisition section F1, an ink amount data generation section F2, a print data generation section F3, a print data distribution section F4, a print data output section F5, a mask setting processing section F6, and the like. Each function will be described below. Moreover, in the embodiment, all or a part of described matters that are executed by the control device 10 may be executed on the printer 20 side. For example, the image data acquisition section F1, the ink amount data generation section F2, the print data generation section F3, the print data distribution section F4, the print data output section F5, the mask setting processing section F6, and the like illustrated in FIG. 2 may be functions that are implemented by a control section 21 of the printer 20 according to a predetermined program.

In the printer 20, an I/F 25 is communicably connected to the I/F 19a on the control device 10 side through a wire or wireless and the control section 21 and the like is connected to the I/F 19a through a system bus. In the control section 21, a CPU 22 executes a predetermined calculating process by reading a program (firmware and the like) stored in a ROM 23 and the like to the appropriate RAM 24. The control section 21 controls each section by connecting to each section of a print head 26, a head driving section 27, a carriage mechanism 28, and a feeding mechanism 29.

The print head 26 is supplied with various inks from a cartridge (not illustrated) for each of a plurality of types of liquid (for example, cyan (C) ink, magenta (M) ink, yellow (Y) ink, black (K) ink, and the like). The print head 26 is capable of discharging (ejecting) ink droplets from a plurality of nozzles provided corresponding to various inks. Of course, a specific type or the number of liquids that are used in the printer 20 is not limited to the above description and, for example, various liquids or inks may be used such as light cyan, light magenta, orange, green, gray, light gray, white, metallic ink, and pre-coat solution, or the like.

The carriage mechanism 28 is controlled by the control section 21 and reciprocates a carriage (not illustrated) that is included in the printer 20 along a predetermined main scanning direction. The print head 26 is mounted on the carriage and the print head 26 performs the reciprocating movement by the carriage. The feeding mechanism 29 is controlled by the control section 21 and transports the printing medium in a feeding direction intersecting the main scanning direction by a roller (not illustrated) and the like. The feeding direction corresponds to "a predetermined direction" in Claims. The head driving section 27 generates a driving voltage for driving a piezoelectric element that is provided corresponding to each nozzle of the print head 26, based on print data (print data are described below) that are acquired by the control section 21 from the control device 10 through the I/F 25. The head driving section 27 outputs the drive voltage to the print head 26. Therefore, the ink droplets for each type of the ink are ejected from each nozzle of the print head 26 that is moved by the carriage onto the printing medium that is transported. The ejected ink droplets are attached to the printing medium and dots are formed on the printing medium, and thereby the image is reproduced on the printing medium based on the print data.

The printing medium is a print substrate and is a material for holding a printed image. A shape thereof is generally rectangular, but includes a circle (for example, optical disc such as CD-ROM, DVD), a triangle, a quadrangle, polygon, and the like, and at least includes all of varieties of paper and paperboard, and a processed product described in Japanese Industrial Standard "JIS P0001: 1998 paper and paperboard, and pulp terminology". Furthermore, the printer 20 includes a display section 30 configured of, for example, a liquid crystal display and an operation section 31 configured of, for example, a keyboard, a touch panel, and the like. In the printer 20, a unit for ejecting the ink droplets from the nozzle is not limited to the piezoelectric element and a unit for ejecting the ink droplets from the nozzle by heating the ink by a heating element may be employed.

Figure 3:
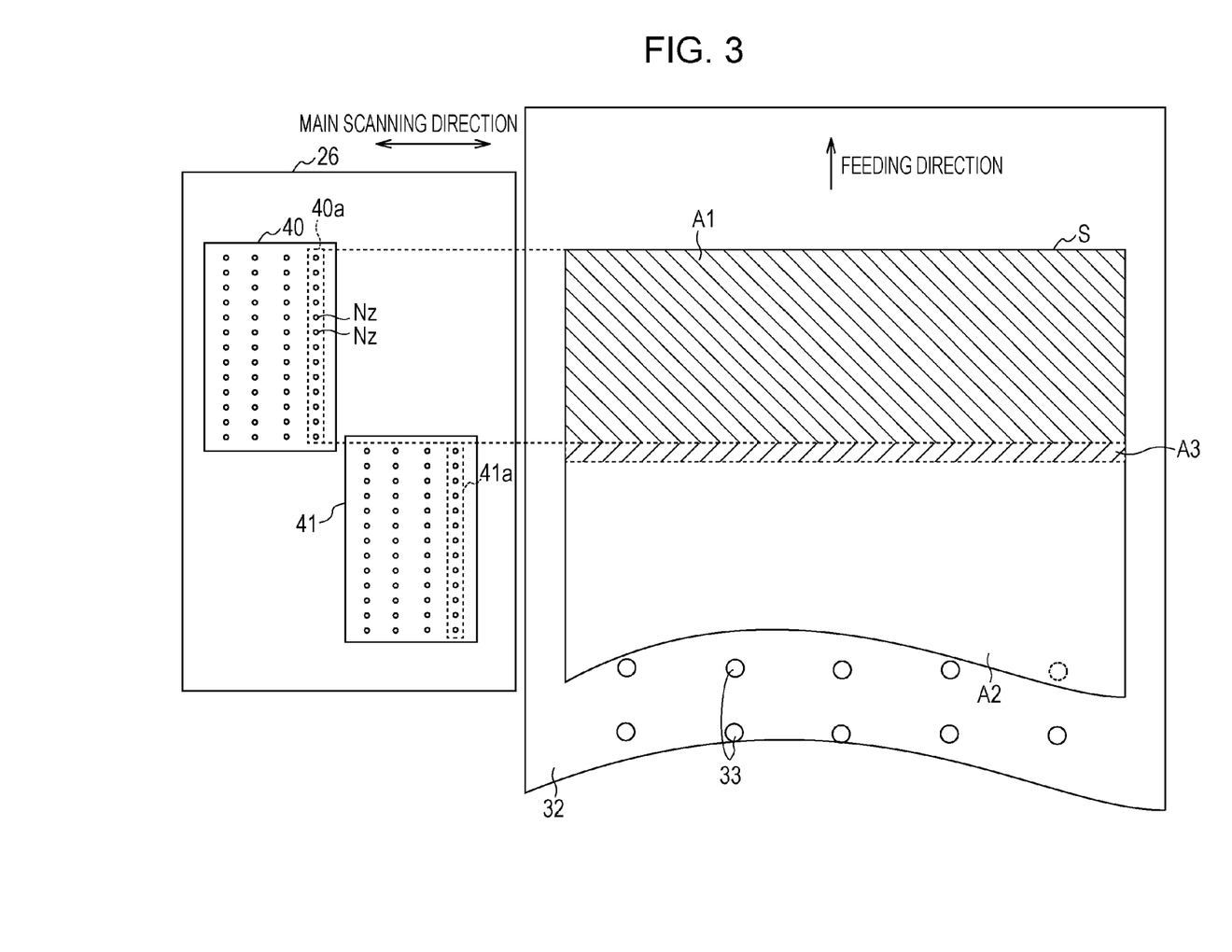
FIG. 3 is a view illustrating a simplified configuration of a print head.

FIG. 3 simply illustrates a configuration of the print head 26 in the printer 20 and the like. Arrangement of nozzles Nz in an ink ejecting surface of the print head 26 is illustrated on the left side in FIG. 3. The ink ejecting surface is a surface of the print head 26 facing a surface of a printing medium S that is transported. The print head 26 includes at least two heads 40 and 41. Since the print head 26 has a configuration in which a plurality of heads 40 and 41 are gathered, the print head 26 may be referred to as a head unit and the like. Each of the heads 40 and 41 has a nozzle column for each ejecting ink color (for example, C, M, Y, and K). The nozzle column is a column in which the nozzles Nz are arranged at equal intervals along the feeding direction and in the example of FIG. 3, four nozzle columns are provided in parallel to each other inside one head. For example, a nozzle column 40a is a nozzle column that ejects the K ink included in the head 40 and a nozzle column 41a is a nozzle column that ejects the K ink included in the head 41. Moreover, the nozzle column corresponding to one ink color may be configured by a plurality of nozzle columns that are disposed by being deviated from each other in the feeding direction.

Such a print head 26 moves in the main scanning direction intersecting (orthogonal to) the feeding direction of the printing medium S. However, in this specification, regarding the direction, the position, or the like of each configuration inside and outside the print head 26, even in a case of expressing parallel, equally spaced, orthogonal, and the like, they do not only mean strictly parallel, equally spaced, and orthogonal, but also mean to include a degree of error that is acceptable in product performance or a degree of error that may occur when a product is produced. As illustrated in FIG. 3, the head 40 and the head 41 are provided in positions that are deviated in the feeding direction. In such a configuration, the nozzles Nz configuring the first nozzle column (nozzle column 40a and the like) included in the head 40 correspond to first nozzles and the nozzles Nz configuring the second nozzle column (nozzle column 41a and the like) included in the head 41 correspond to second nozzles. Moreover, in a portion connecting the first nozzle column and the second nozzle column, end portions thereof may overlap (see an overlapping portion disclosed in JP-A-2012-171140) or may not overlap.

A state where the printing medium S is in a print starting position is illustrated on the right side in FIG. 3. That is, after the printing medium S is transported to the print starting position, the print head 26 is started to move and the ejection of the ink onto the printing medium S is performed. The printing medium S is transported on a platen 32. A plurality of suction holes 33 are formed in the platen 32 and air is sucked from the suction holes 33, and thereby a posture of the printing medium S is stable in a flat shape. In FIG. 3, only a part of the suction holes 33 is illustrated, but the ejection of the ink is performed by the print head 26 in a state where an entirety of the suction holes 33 are closed by the printing medium S. In other words, since the posture of an end portion of the printing medium S is not stable in a state where a part of the suction holes 33 is not closed, the ejection of the ink is not started by the print head 26. Therefore, it may be said that the print starting position described above is a position to which the printing medium S is transported along the feeding direction until the entirety of the suction holes 33 are in a closed state. If the printing medium S is originally rounded roll paper, specifically, in order to flatten the posture of the paper, it is necessary to start the printing in a state where the entirety of the suction holes 33 are ensured to be closed by the paper.

When transmitting the printing medium S to the print starting position, a part of the printing medium S on a front side in the feeding direction (hereinafter, simply referred to as the front side) is positioned further on the front side than the head 41. Therefore, the part thereof is printable only by the head 40 (the first nozzles configuring the first nozzle column) that is the foremost in the print head 26 and the image that is printed in such a portion is a first region (region A1). In contrast, the image that is printed further on a rear side (hereinafter, simply referred to as the rear side) than the region A1 in the feeding direction is an image that is printed by the head 40 and the head 41 (the first nozzles configuring the first nozzle column and the second nozzles configuring the second nozzle column) and is a second region (region A2). Moreover, in FIG. 3, for convenience, a symbol A2 is given to a range in which the region A2 is printed.

In the embodiment, a transition region A3 is provided between the region A1 and the region A2 described above. The transition region A3 is a region that is printed by the head 40 and the head 41 (the first nozzles configuring the first nozzle column and the second nozzles configuring the second nozzle column) similar to the region A2 and corresponds to a third region.

Moreover, in FIG. 3, it is described that the region that is printed only by one head is generated in a part of the printing medium S on the front side, but a similar region may be generated even in a part of the printing medium S on the rear side. For example, in FIG. 3, the printing medium S is transported reversely to the indicated feeding direction and the head 40 is the rearmost head, and the end portion of the printing medium S on the rear side that is present in a print end position is illustrated. The print end position means a position in which the printing medium S is not transported any more by the feeding mechanism 29 and is determined depending on a position of the roller and the like included in the feeding mechanism 29. In such a case, the first region that is printed only by the rearmost head 40 (the first nozzles configuring the first nozzle column) in the print head 26 and the second region that is the further front side than the first region and is printed by the head 40 and the head (the first nozzles configuring the first nozzle column and the second nozzles configuring the second nozzle column) are generated. Therefore, in the embodiment, it is also possible to provide the third region between the first region that is printed only by the rearmost head 40 and the second region that is further on the front side than the first region and is printed by the head 40 and the head 41.

The number of the heads included in the print head 26 is not limited to two (heads 40 and 41) as illustrated in FIG. 3. The print head 26 may be configured such that three or more heads are lined in the feeding direction. In any case, in the embodiment, the first region that is printed only by the nozzles configuring the foremost (or rearmost) nozzle column in the head included in the print head 26, the second region that is printed by the nozzles of each nozzle column that is provided in a plurality of heads including the foremost (or the rearmost) head, and the third region that connects the first region and the second region and is printed by the nozzles of each nozzle column that is provided in the plurality of heads including the foremost (or the rearmost) head are formed on the printing medium.

2. Printer Adjusting Method

Figure 4:
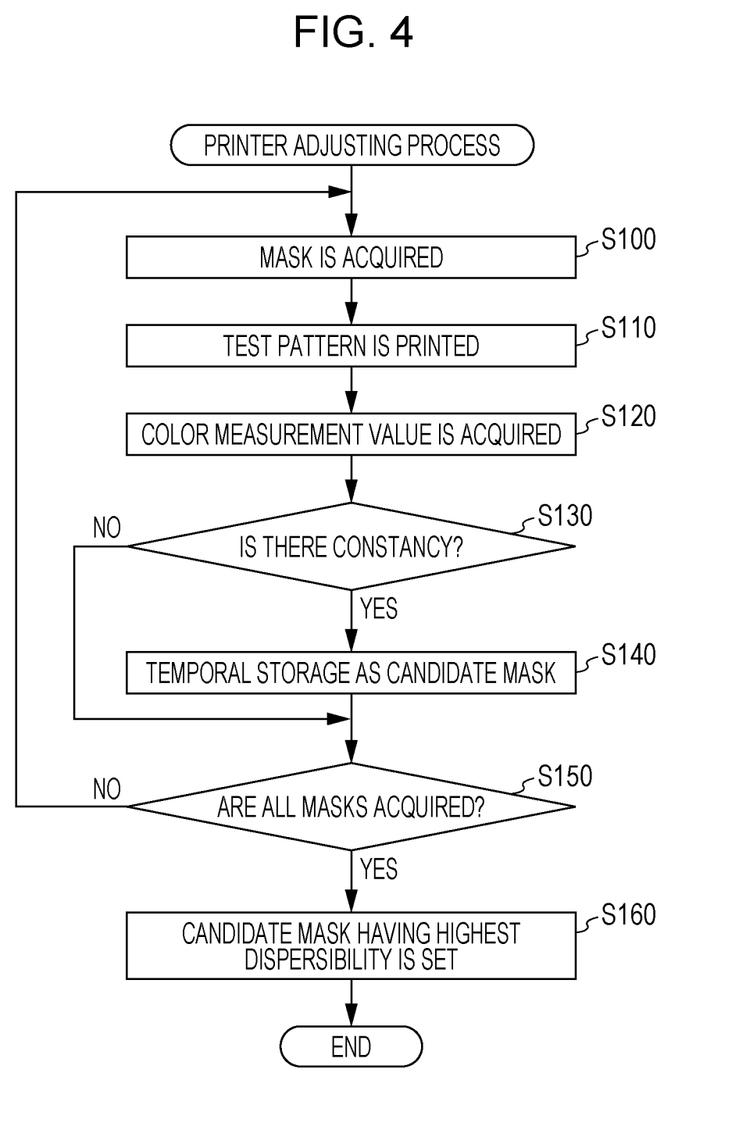
FIG. 4 is a flowchart illustrating a printer adjusting process.

FIG. 4 is a flowchart illustrating a printer adjusting process (printer adjusting method).

In step S100, the mask setting processing section F6 (FIG. 2) acquires one mask to apply for printing of the transition region A3. Step S100 corresponds to a mask acquiring process. The acquisition of the mask in step S100 means to include a case where the mask that is stored in a predetermined storage region (HD 16 and the like) in advance is read and a case where the mask is generated each time thereof. The mask is information that defines a correspondence relationship between the position of each pixel in the print data and one of the first nozzles or the second nozzles that are used for ejecting the ink depending on a usage rate in the first nozzles and the second nozzles. In the embodiment, the mask (second region mask) that is applied for printing the region A2 and the mask (transition region mask) that is applied for printing the transition region A3 are needed, and the printer adjusting process is a process in which the optimal transition region mask is set by the printer 20. On the other hand, basically, the second region mask is a mask in which the usage rate of the first nozzles and the usage rate of the second nozzles are 50% versus 50% and the pixels corresponding to the first nozzles and the pixels corresponding to the second nozzles are respectively disposed alternately vertically and horizontally, and is determined in advance.

In step S110, the mask setting processing section F6 causes the printer 20 to print the test pattern on the printing medium, based on test pattern data expressing a predetermined test pattern. Step S110 corresponds to a test pattern printing process. The test pattern data is bitmap data in which each pixel has gradation values (for example, 256 gradations from 0 to 255) equivalent to an ink amount, and is prepared in advance. Specific details of the test pattern are not particularly limited, but, for example, are a solid image that expresses an entire surface of the printable region of the printing medium with a certain one concentration (gradation value) of a certain one ink color (K).

In the test pattern printing process, a halftone process (halftoning) is applied to the test pattern data. Specific methods of the halftone process are not particularly limited. For example, the halftone process may be performed by dithering using a dither mask that is defined in advance and may be performed by an error diffusion method. Halftone data that defines ejection (dot formation) or non-ejection (dot non-formation) of each color ink of CMYK for each pixel is generated by the halftone process. The halftone data corresponds to the print data.

Then, the print data that is generated as described above, is divided into first print data corresponding to the nozzles (first nozzles) of the head 40 and second print data corresponding to the nozzles (second nozzles) of the head 40. Specifically, data (pixel group) in a range corresponding to the region A1 described above among the print data are all the first print data. Furthermore, the second region mask is applied to data (pixel group) in a range corresponding to the region A2 among the print data and the print data is divided into the first print data and the second print data. Furthermore, the transition region mask acquired in step S100 is applied to data (pixel group) of a range corresponding to the transition region A3 among the print data and the print data is divided into the first print data and the second print data. Moreover, the mask setting processing section F6 can specify that each pixel configuring the print data corresponds to any of the regions A1, A2, and A3 by referring to a table defining the correspondence relationship between coordinates of the pixels and the regions A1, A2, and A3 in advance.

Figure 5A:
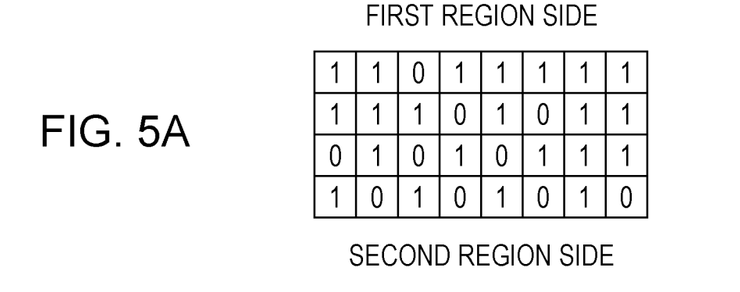
FIGS. 5A to 5C are views illustrating a transition region mask.
Figure 5B:
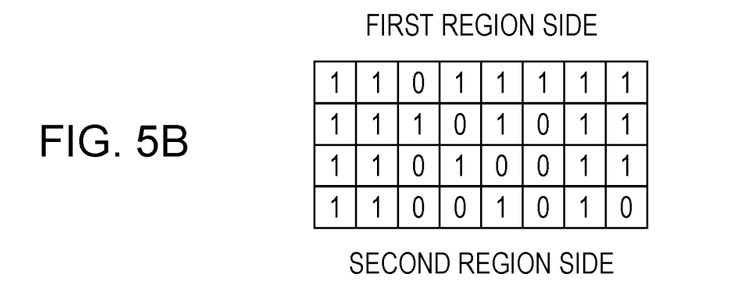
Figure 5C:
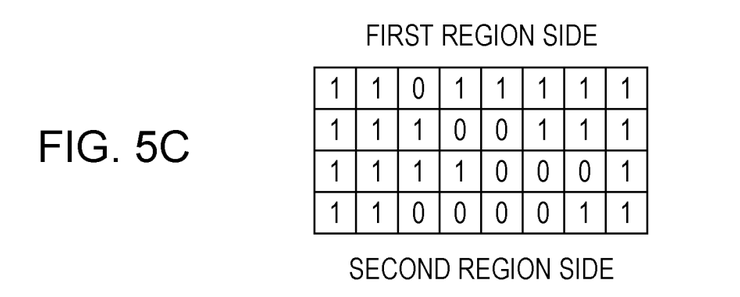

FIGS. 5A, 5B, and 5C respectively illustrate the transition region mask that is acquired in step S100. The transition region mask defines "1" or "0" for each pixel and "1" means the position of the first print data and "0" means the position of the second print data. That is, when the transition region mask is applied (overlapped) to the data (pixel group) in the range corresponding to the transition region A3 among the print data, the pixels of the print data in which "1" of the transition region mask is positioned are distributed to the first print data and the pixels of the print data in which "0" of the transition region mask is positioned are distributed to the second print data. A ratio of "1" and "0" in the mask is the usage rate of the first nozzles and the second nozzles. The ratio of "1" and "0" in the transition region mask corresponds to "second usage rate" or "specific usage rate" represented in the Claims. Moreover, as a structure of the second region is the same as that of the transition region mask, the ratio (corresponding to "first usage rate" represented in the Claims) of "1" and "0" in the mask is set to be 50% versus 50% as described above.

As illustrated in FIGS. 5A, 5B, and 5C, in each transition region mask, the rate of "0" with respect to "1", that is, the usage rate of the second nozzles, is increased from the first region (region A1) side to the second region (region A2) side. Specifically, in the transition region mask, incidence of "0" in the pixel column on the furthest first region side is the usage rate of the second nozzles in the first region, that is, a value equal to 0% or close to 0% and the incidence of "0" in the pixel column on the furthest most second region side is the usage rate of the second nozzles in the second region, that is, a value equal to 50% or close to 50%. A degree of such an increase in the usage rate of the second nozzles is basically constant, but may be not constant.

Furthermore, as illustrated in FIGS. 5A, 5B, and 5C, in the transition region mask that can be acquired in step S100, the degrees of the dispersion of "0" in the mask, that is, the degrees of the dispersion of the pixels corresponding to the second nozzles, are different from each other. In the example of FIGS. 5A, 5B, and 5C, in the transition region mask illustrated in FIG. 5A, the degree of the dispersion is the highest and in the transition region mask illustrated in FIG. 5C, the degree of the dispersion is the lowest. That is, in step S100, any one of a plurality of transition region masks is acquired which are the transition region masks in which the usage rate of the second nozzles is increased from the first region side to the second region side and in which the degree of the dispersion of the pixels corresponding to the second nozzles are different from each other.

The first print data and the second print data divided from the print data described above are respectively arranged in order to be transported to the print head 26. The dots of the ink that are defined by the first print data are determined to be ejected by any nozzles Nz in the head 40 at any timing by the arranging process depending on the pixel position and the ink color. Similarly, the dots of the ink that are defined by the second print data are determined to be ejected by any nozzles Nz in the head 41 at any timing by the arranging process depending on the pixel position and the ink color. The first print data and the second print data after the arranging process is performed are output to the printer 20 side through the I/F 19a. Therefore, in the printer 20, each of the nozzles Nz in the head 40 is driven based on the first print data and each of the nozzles Nz in the head 41 is driven based on the second print data, and the test pattern is printed onto the printing medium.

In step S120, the mask setting processing section F6 acquires a color measurement value of the test pattern that is printed in step S110. That is, the test pattern that is printed onto the printing medium is color-measured by the color measuring device 50 and a color measurement result is input from the color measuring device 50. For example, the mask setting processing section F6 inputs the color value represented by L*, a*, and b* components of CIE L*a*b* color space defined in the International Commission on Illumination (CIE) as the color measurement value.

In step S130, the mask setting processing section F6 analyzes the degree of change of the color measurement value (color value) of the test pattern acquired in step S120. The step S130 corresponds to an analyzing process.

Figure 6:
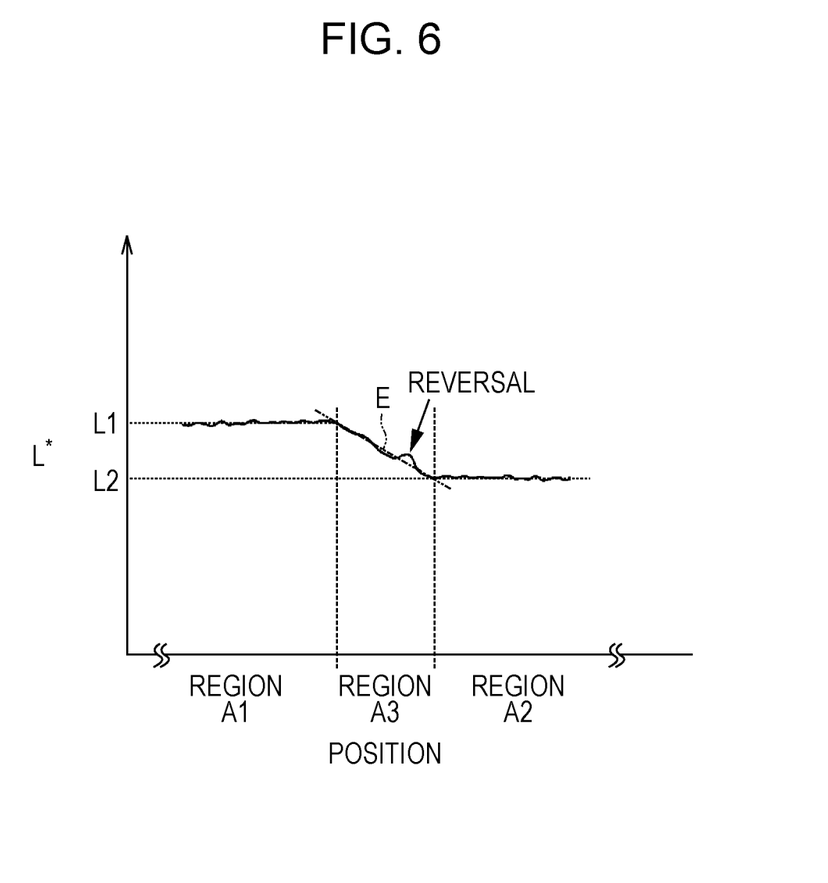
FIG. 6 is a view illustrating a change in a color value of a test pattern.

FIG. 6 is a graph illustrating a change in the color value of the test pattern. In FIG. 6, a horizontal axis is the position (position of the printing medium along the feeding direction) and a vertical axis is brightness L* corresponding to each position. However, in step S130, the color value of an analysis object may be a* and b* components and may be a value obtained by linearly adding L*, a*, and b*. An average value L1 of the brightness obtained by color-measuring of the region A1 and an average value L2 of the brightness obtained by color-measuring of the region A2 are represented in FIG. 6. There is a difference in the average values L1 and L2. This is because ink ejection characteristics of the nozzles Nz in the head 40 are different from ink ejection characteristics of the nozzles Nz in the head 41. For example, if there is a trend that a weight per ink droplet ejected from the nozzles Nz of the head 40 is lighter than that ejected from the nozzles Nz of the head 41, as illustrated in FIG. 6, the brightness (average value L1 thereof) of the region A1 that is printed only by the nozzles Nz of the head 40 is higher (brightened) than the brightness (average value L2 thereof) of the region A2 that is printed by substantially evenly using the nozzles Nz of the head 40 and the nozzles Nz of the head 41. In contrast, if there is a trend that the weight per ink droplet ejected from the nozzles Nz of the head 40 is heavier than that ejected from the nozzles Nz of the head 41, then L1<L2.

In the mask setting processing section F6, for example, a straight line E (two-dot dashed line in FIG. 6) connecting the average value L1 and the average value L2 is drawn in the range corresponding to the transition region A3 in the graph. Then, it is determined that whether or not a predetermined constancy or more exists in the change (here, change in the brightness) in the color value in the transition region A3 by analyzing a degree of approximation between the straight line E and the brightness of the transition region A3. The constancy as used herein refers to a change in the brightness at a constant rate from the region A1 side to the region A2 side in the transition region A3. For example, the mask setting processing section F6 determines that there is no constancy if reversal (see FIG. 6) occurs in the change in the brightness of the transition region A3. For example, it is ideal that lowering in the change in the brightness is maintained from the region A1 side to the region A2 side if L1>L2, but the reversal in the change in the brightness means the change in the brightness (increase in the brightness) contrary to the ideal change. Furthermore, the mask setting processing section F6 calculates the difference (absolute value) in the brightness of the transition region A3 and the straight line E and determines that the difference is a predetermined threshold value or less in all positions even if there is no reversal in the brightness of the transition region A3. Then, it is determined that there is no predetermined constancy or more if the difference exceeds the threshold value in a part of the positions.

The mask setting processing section F6 determines that there is a predetermined constancy or more in the change (change in the brightness) of the color value in the transition region A3 if there is no reversal in the brightness of the transition region A3 and the difference in the brightness of the transition region A3 and the straight line E is the threshold value or less in all positions and the process proceeds to step S140. On the other hand, if it is determined that there is no predetermined constancy or more, the process proceeds to step S150 by skipping step S140. Moreover, other specific analyzing methods may be conceived in step S130. For example, the mask setting processing section F6 calculates an approximate curve for the change in the brightness in the transition region A3 and evaluates the degree of approximation between the approximate curve and the straight line E, and thereby branching to the case where there is a predetermined constancy or more (the degree of approximation is high) or to the case where there is no predetermined constancy or more (the degree of approximation is low).

In step S140, the mask setting processing section F6 temporarily stores the transition region mask acquired in step S100 in a predetermined memory (for example, a predetermined memory in the control section 11). The transition region mask that is temporarily stored as described above is referred to as a candidate mask.

In step S150, the mask setting processing section F6 determines whether or not the process of step S100 and subsequent steps by acquiring all transition region masks that can be acquired in step S100. Then, if the transition region mask that is not acquired exists, the process returns to step S100 and the transition region mask that is not acquired is acquired and the process of step S100 and subsequent is performed. On the other hand, if the transition region mask that is not acquired does not exist, the process proceeds to step S160. A total number of the transition region masks which can be obtained in step S100 is not specifically limited and may be more than the three illustrated in FIGS. 5A, 5B, and 5C.

In step S160, the mask setting processing section F6 selects one transition region mask among the candidate masks to be applied to the printer 20 and sets the transition region mask to the printer 20 (stores the transition region mask as the mask D in a predetermined memory (for example, a predetermined memory in the control section 21) included in the printer 20). The step S160 corresponds to a mask setting process. If there is only one candidate mask, the mask setting processing section F6 sets the one candidate mask to the printer 20 as the mask D. If there are a plurality of candidate masks, the mask setting processing section F6 sets the candidate mask in which the degree (dispersibility) of the dispersion of the pixels corresponding to the second nozzles is the highest among the plurality of candidate masks to the printer 20 as the mask D.

As described above, the printer adjusting process applied to one printer 20 is completed. If there are a plurality of printers 20, the printer adjusting process is performed with respect to each printer 20. A printer adjusting process can be expressed such that if it is determined that there is a predetermined constancy or more in the change in the color value based on the result of the analysis ("Yes" in step S130), the first mask (a mask for the transition region acquired in the nearest step S100) or the second mask in which the degree of the dispersion of the pixels corresponding to the second nozzles is higher than that in the first mask is set to the printer 20 (step S160) and if it is determined that there is no predetermined constancy or more in the change in the color value ("No" in step S130), the third mask in which the degree of the dispersion of the pixels corresponding to the second nozzles is lower than that in the first mask is set to the printer (step S160).

Further description regarding the printer adjusting process will be supplemented.

Figure 7A:
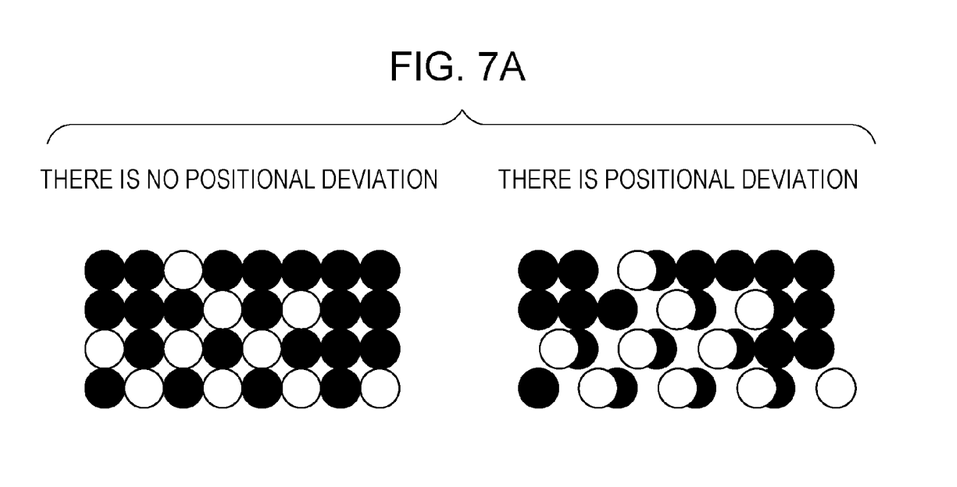
FIGS. 7A and 7B are views illustrating a print result of a transition region by a printer.
Figure 7B:
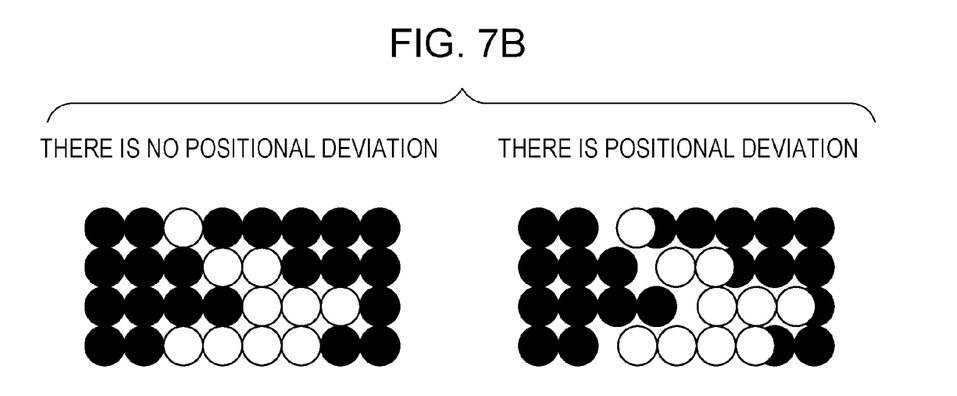

FIGS. 7A and 7B illustrate print results of the transition region A3 by the printer 20. In FIGS. 7A and 7B, a black dot indicates a dot by the ink droplet ejected from the nozzles Nz of the head 40 and a white dot indicates a dot by the ink droplet ejected from the nozzles Nz of the head 41. Furthermore, FIG. 7A illustrates the transition region A3 that is printed by applying the transition region mask (transition region mask in which the degree of the dispersion of the pixels corresponding to the second nozzles (nozzles Nz of the head 41) is high) indicated in FIG. 5A, and FIG. 7B illustrates the transition region A3 that is printed by applying the transition region mask (transition region mask in which the degree of the dispersion of the pixels corresponding to the second nozzles (nozzles Nz of the head 41) is low) indicated in FIG. 5C. Furthermore, in both FIGS. 7A and 7B, a print result when there is no positional deviation and a print result when there is a positional deviation are illustrated.

The positional deviation is a deviation between the ink droplets ejected from the nozzles Nz of the head 40 and the ink droplets ejected from the nozzles Nz of the head 41. If it is ideal that the equally spaced dots are formed on the printing medium no matter which head the nozzles ejecting the ink droplets belong to (nozzle column), it may be said that "there is no positional deviation" in FIGS. 7A and 7B represents one ideal state. On the other hand, as "there is the positional deviation" in FIGS. 7A and 7B, terms that there is the positional deviation mean that the positional relationship between the dot (black dot) by the nozzles Nz of the head 40 and the dot (white dot) by the nozzles Nz of the head 41 is collapsed and a gap (a place that should be originally covered by the dot is not actually covered by the dot) that should not originally exist occurs. Such a positional deviation is caused by many things such as an error in the mounting position of each of the heads 40 and 41 in the print head 26, characteristics of response and the like with respect to the drive signal of each of the heads 40 and 41, a difference in an ejection speed of the ink droplets of each of the heads 40 and 41, and a difference in weight per ink droplet of each of the heads 40 and 41.

When comparing FIGS. 7A and 7B, when there is the positional deviation, the gap occurs in both views. However, the gaps are dispersed and occur more in FIG. 7A in which the transition region mask in which the degree of the dispersion of the pixels corresponding to the second nozzles (nozzles Nz of the head 41) is high is applied than in FIG. 7B in which the transition region mask in which the degree of the dispersion of the pixels corresponding to the second nozzles (nozzles Nz of the head 41) is low is applied. This is because if the transition region mask in which the degree of the dispersion is low is applied, it is easy to collect the dots (white dots) formed by the nozzles Nz of the head 41 and such collected dots are similarly deviated, and, as a result, a part of the gaps is covered. More specifically, as described above, if a degree of collection is high, when the dots (white dots) formed by the nozzles Nz of the head 41 are deviated in a constant direction, the gaps occurring due to the deviation are covered by the deviation in the constant direction similarly to in the adjacent dots (white dots) on the opposite side in the constant direction with respect to the dots.

As illustrated in FIG. 7A in which there is the positional deviation, when many gaps are dispersed and occur, regarding the change in the color value of the transition region A3, the degree of the change that is originally ideal is likely to fail. For example, as illustrated in FIG. 6, if L1>L2, it is ideal that the brightness from the region A1 side to the region A2 side in the transition region A3 is lowered from L1 to L2 at a rate as constant as possible. However, if the many gaps are dispersed and occur, such an ideal brightness change is likely to be failed and the degree of the change may be irregular, and reversal occurs sometimes as illustrated in FIG. 6. Such irregularity or reversal of the change in the color value in the transition region A3 is likely to be recognized as deterioration of image quality to the user who observes the print result.

In the printer adjusting process, in order to have a predetermined constancy or more regarding the change in the color value of the transition region A3 based on such consideration, the transition region mask that defines the disposition of the pixels corresponding to the first nozzles and the pixels corresponding to the second nozzles is set as the mask D. Therefore, in the embodiment, it depends on the degree of the positional deviation described above, but the transition region mask in which the degree of the dispersion of the pixels corresponding to the second nozzles is relatively low is likely to be set as the mask D to the printer 20. When the degree of the dispersion of the pixels corresponding to the second nozzles is a first degree of the dispersion (for example, the degree of the dispersion of "0" in the transition region mask in FIG. 5A) in a case where the pixels corresponding to the second nozzles are not adjacent to each other in both the first direction in which the pixels are arranged and the second direction orthogonal to the first direction, it may be said that the mask D that is applied to the printing of the transition region A3 by a certain printer 20 is the mask (for example, the transition region mask in FIG. 5B or FIG. 5C) in which the degree of the dispersion of the pixels corresponding to the second nozzles is the degree of the dispersion that is lower than the first degree of the dispersion.

However, lowering the dispersibility of the dots formed by the same dots is likely to lead to reduction (noticeable graininess of the dots) of the graininess in the printing result. Thus, in the printer adjusting process, the mask having the highest degree of the dispersion of the pixels corresponding to the second nozzles among the transition region masks that implement a predetermined constancy or more regarding the change in the color value of the transition region A3 is set as the mask D.

3. Print Control Process with Application of Set Mask

Figure 8:
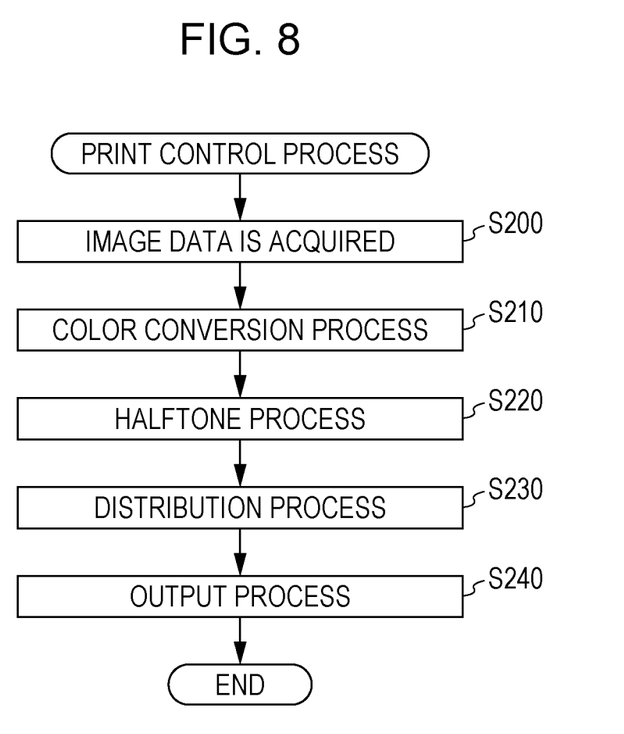
FIG. 8 is a flowchart illustrating a print control process.

FIG. 8 is a flowchart illustrating a process (print control process) in which the control device 10 performs printing in the printer 20 according to the printer driver PD. The process is accompanied by the distribution process of the print data using the mask D that is set as described above.

In step S200, the image data acquisition section F1 (FIG. 2) acquires the image data that are arbitrarily selected by the user from a predetermined input source. That is, the user operates the operation section 18 and the like while visually recognizing a user interface screen (UI screen) displayed on the display section 17 and the like and thereby the image data expressing the image to be printed can be arbitrarily selected. The input source of the image data is not specifically limited and, for example, any image input device communicably connected to the control device 10 is applicable in addition to a memory card (not illustrated) and the like inserted from the outside into the HD 16, the control device 10, or the printer 20.

For example, a format of the image data (input image data) acquired in step S200 is a bitmap format and has each gradation value of R (red), G (green), and B (blue) for each pixel. Furthermore, the image data acquisition section F1 converts the acquired image data into data of the color system if the acquired image data do not correspond to the RGB color system. Furthermore, the image data acquisition section F1 appropriately performs a resolution conversion process with respect to the image data to match the print resolution of the printer 20.

In step S210, the ink amount data generation section F2 (FIG. 2) performs the color conversion process as the target image data after step S200. That is, the color system of the image data is converted into an ink color system that is used for printing by the printer 20. As described above, if the gradation in the image data expresses the color of each pixel in RGB, the gradation value of RGB for each pixel is converted into the gradation value for each CMYK. In the following description, the image data that is expressed in the gradation value of CMYK for each pixel is referred to as "ink amount data". The color conversion process can be performed by referring to an arbitrary color conversion lookup table.

In step S220, the print data generation section F3 (FIG. 2) performs the halftone process on the ink amount data acquired in step S210 and generates the halftone data (print data).

In step S230, the print data distribution section F4 (FIG. 2) performs the distribution process that distributes the print data generated in step S220 to the first print data and the second print data. That is, the data (pixel group) in the range corresponding to the region A1 among the print data are all distributed to the first print data. Furthermore, the second region mask described above is applied to the data (pixel group) of the range corresponding to the region A2 among the print data and the data are divided into the first print data and the second print data. Furthermore, for the data (pixel group) of the range corresponding to the transition region A3 among the print data, the mask D included in the printer 20 is read from the printer 20 and the data is divided into the first print data and the second print data by applying the mask D. Moreover, as described above, which of the regions A1, A2, and A3 each pixel configuring the print data corresponds to is specified by referring to a table in which the correspondence relationship between the coordinates of the pixels and the regions A1, A2, and A3 is defined in advance.

In step S240, the print data output section F5 (FIG. 2) performs the arranging process described above with respect to the first print data and the second print data which are divided from the print data in step S230, and the first print data and the second print data after the arranging process are output to the printer 20 side through the I/F 19a. Thus, the printer 20 causes each of the nozzles Nz in the head 40 to be driven based on the first print data and each of the nozzles Nz in the head 41 to be driven based on the second print data, and performs the printing of the image that is expressed by the image data acquired in step S200 onto the printing medium. Of course, the image that is printed as described above includes the regions A1, A2, and A3.

According to such an embodiment, the transition region A3 that is printed by the nozzles Nz included in the head 40 and the nozzles Nz included in the head 41 is provided between the region A1 that is printed only by the nozzles Nz included in the head 40 and the region A2 that is printed by the nozzles Nz included in the head 40 and the nozzles Nz included in the head 41. When printing the transition region A3, the mask D that is applied to the distribution of the print data is the mask in which the usage rate of the nozzles Nz included in the head 41 is increased from the region A1 side to the region A2 side. Thus, the difference (for example, difference between L1 and L2 illustrated in FIG. 6) in the color value between the region A1 and the region A2 is difficult to recognize in the eyes of the user by interposing the transition region A3 and, as a result, the image quality is improved.

Furthermore, in the embodiment, as the mask D, the mask that implements a predetermined constancy or more for the change in the color value of the transition region A3 and achieves the graininess to some extent is employed. Thus, in the transition region A3, the printer 20 can realize an entirely good image quality in which the failure of the change in the color value does not exist and deterioration of graininess is suppressed. Furthermore, in the embodiment, the printer adjusting process is performed for each printer 20. Therefore, in each printer 20, the optimal mask D (mask D defining the disposition of the dots, in which irregularity or the reversal of the change in the color value in the transition region A3 caused by the positional deviation is suppressed) is set depending on the degree of the positional deviation inherent in the apparatus body.

4. Modification Examples

The invention is not limited to the above embodiment and it is possible to implement the invention in various modes without departing from the gist thereof, and, for example, the following modification examples are also possible. Configurations that appropriately combine the above embodiment or each of the modification examples are also within the scope of the invention.

In a case where a difference in the color value between a region A1 and a region A2 is great, if a distance between the region A1 and the region A2 is short, it may be said that the user strongly visually recognizes the difference between both regions. Thus, if the difference in the color value between the region A1 and the region A2 is great, the difference between the two regions is unlikely to be recognized by ensuring that the distance between the region A1 and the region A2 is long. Thus, as a modification example, a control section 11 sets a length of a transition region A3 in the feeding direction depending on the difference in the color value between the region A1 and the region A2.

For example, in step S160 (FIG. 4), when setting the mask D on the printer 20, the mask setting processing section F6 sets length information representing the length of the transition region A3 that is determined depending on the difference in the color value between the region A1 and the region A2 together with the information of the mask D. For example, the mask setting processing section F6 sets a great value as the length information as the difference (difference as an absolute value) between the L1 and L2 becomes great. For example, the length information is the number of pixels.

Then, in step S230 of the print control process (FIG. 8), the print data distribution section F4 also reads the length information that exists together with the mask D and updates a table in which the correspondence relationship between the coordinates of the pixels and the regions A1, A2, and A3 described above is defined. That is, the length (the number of pixels in a direction corresponding to the feeding direction) of the transition region A3 that is defined in the previous table is rewritten by the length information. Then, the print data distribution section F4 specifies data (pixel group) of the range corresponding to the transition region A3 among the print data and the mask D is applied to the specified pixel group with reference to the table that is updated.

The difference between the region A2 and the transition region A3 in the image that is printed on the printing medium is a difference in which the mask that is applied when dividing the print data into the first print data and the second print data is the second region mask or the mask D. Thus, according to the modification example, it may be said that the length of the transition region A3 in the feeding direction is set depending on the length information. Moreover, the change of the length of the transition region A3 in the feeding direction influences the length of the region A2 in the feeding direction, but does not influence the length of the region A1 in the feeding direction. That is, if the transition region A3 is set to be long in the feeding direction, the region A2 is to be short by that amount, accordingly, and if the transition region A3 is set to be short, the region A2 is to be long by that amount, accordingly.

Furthermore, as a modification example, the mask D may be set for each ink color that is used by the printer 20. If the ink color is different, a degree of the influence to the image quality is also different. For example, in the printer adjusting process (FIG. 4) for one printer 20, a test pattern is printed for each ink color and the mask D is set for each ink color, based on a color measurement result of the test pattern for each ink color. According to the configuration, for the printing of the transition region A3, the optimal mask D is set to suppress the failure of the change in the color value and also to suppress deterioration of graininess for each ink color. Then, in the print control process (FIG. 8), a version of each ink color configuring the print data corresponding to the transition region A3 is divided into the first print data and the second print data by the mask D regarding the corresponding ink color.

Alternatively, it may be also said that even if the failure of the change in the color value described above exists, such failure is unlikely to be visually recognized by the user in the ink having relatively thin color. Thus, for some ink (for example, Y ink) having relatively thin color in the ink that is used by the printer 20, the mask in which the degree of the dispersion of the pixels corresponding to the second nozzles is the highest (effect of improving the graininess is highest) among the transition region mask that is capable of being obtained in step S100 may be set as the mask D.

Furthermore, as a modification example, the mask D may be set for each type (for example, glossy paper, matte paper, and the like) of the printing medium which is capable of being used by the printer 20. If the printing medium that is used in the printing is different, the color value that is obtained is different even in a case where the same image is printed. That is, in the printer adjusting process (FIG. 4) for one printer 20, the test pattern is printed on each type of the printing medium and the mask D is set for each type of the printing medium, based on the color measurement result of the test pattern for each type of the printing medium. According to such a configuration, for the printing of the transition region A3, the optimal mask D is set to suppress the failure of the change in the color value and also to suppress deterioration of graininess for each type of the printing medium. Then, in the print control process (FIG. 8), the print data corresponding to the transition region A3 is divided into the first print data and the second print data by the mask D corresponding to the type of the printing medium that is set as the type used by the printer 20.

What is claimed is:

1. A print control device comprising:
a control section that controls a print head that includes a first nozzle column in which first nozzles ejecting liquid are arranged in a predetermined direction and a second nozzle column in which second nozzles ejecting the liquid are arranged in the predetermined direction and which is provided in a position deviated from the first nozzle column in the predetermined direction, and causes the liquid to be ejected onto a printing medium transported in the predetermined direction,
wherein the control section causes a first region that is expressed by the liquid ejected only by the first nozzles, a second region that is expressed by the liquid ejected from the first nozzles and the second nozzles depending on a first usage rate of the first nozzles and the second nozzles, and a third region that connects the first region and the second region, and is expressed by the liquid ejected from the first nozzles and the second nozzles depending on a second usage rate different from the first usage rate to be printed onto the printing medium,
wherein the second usage rate is a value that is obtained by increasing a usage rate of the second nozzles from a first region side to a second region side, and
wherein in the third region, the control section gradually increases the second usage rate of the second nozzles with respect to the first usage rate of first nozzles from the first region side of the third region to the second region side of the third region so that the proportion of the second usage rate of the second nozzles to the first usage rate of the first nozzles on the second region side of the third region is equivalent to the second usage rate of the second nozzles to the first usage rate of the first nozzles in the second region,
wherein the control section divides print data into a first print data corresponding to the first nozzles and second print data corresponding to the second nozzles by applying a mask that defines a correspondence relationship between each pixel position in the print data and one of the first nozzles or the second nozzles which are used to eject the liquid depending on the second usage rate to the print data generated based on input image data, and causes the third region to be printed by ejecting the liquid from the first nozzles based on the first print data and by ejecting the liquid from the second nozzles based on the second print data, and
wherein the mask is a mask in which a degree of dispersion of the pixels corresponding to the second nozzles is lower than a first degree of the dispersion when the degree of the dispersion of the pixels corresponding to the second nozzles is the first degree of the dispersion when the pixels corresponding to the second nozzles are not adjacent to each other even in one of a first direction in which pixels are arranged and a second direction orthogonal to the first direction.

2. The print control device according to claim 1,
wherein the mask is a mask that defines arrangement of pixels corresponding to the first nozzles and pixels corresponding to the second nozzles so as to have predetermined constancy or more in a change in a color value in the third region from the first region to the second region.

3. The print control device according to claim 1,
wherein the control section divides print data into the first print data corresponding to the first nozzles and the second print data corresponding to the second nozzles by applying the mask to the print data that expresses a predetermined test pattern and executes multiple times a process of printing the test pattern onto the printing medium by applying a plurality of masks in which degrees of the dispersion of the pixels corresponding to the second nozzles are different from each other by ejecting the liquid from the first nozzles based on the first print data and ejecting the liquid from the second nozzles based on the second print data,
wherein the control section acquires a color measurement result of the test pattern that is printed for each of the test patterns in which the applied masks are different from each other and analyzes a degree of change in the color values for each of the test patterns,
wherein the control section specifies the mask applied to the printing of the test pattern having a predetermined constancy or more applied to the change in the color value, based on a result of the analysis, and
wherein the control section sets the specified mask as a mask that is used to print the third region.

4. The print control device according to claim 3,
wherein the control section sets the mask in which the degree of the dispersion is the highest among the specified plurality of masks as the mask that is used to print the third region when the plurality of masks applied to the printing of the test patterns having a predetermined constancy or more in the change in the color values are specified.

5. The print control device according to claim 1,
wherein the control section sets a length of the third region in the predetermined direction depending on a difference in the color value between the first region and the second region.

6. A printer adjusting method that adjusts a printer including a print head that has a first nozzle column in which first nozzles ejecting liquid are arranged in a predetermined direction and a second nozzle column in which second nozzles ejecting the liquid are arranged in the predetermined direction and which is provided in a position deviated from the first nozzle column in the predetermined direction, and ejecting the liquid onto a printing medium transported in the predetermined direction, the method comprising:
acquiring a mask that acquires a first mask which defines a correspondence relationship between each pixel position in print data and one of the first nozzles and the second nozzles which are used to eject the liquid depending on a specific usage rate between the first nozzles and the second nozzles, and in which the specific usage rate is a value obtained by increasing the usage rate of the second nozzles from one side to the other side in a direction in which the pixels are arranged corresponding to the predetermined direction;
printing a test pattern that prints the test pattern onto the printing medium by dividing the print data into first print data corresponding to the first nozzles and second print data corresponding to the second nozzles by applying the first mask to the print data expressing a predetermined test pattern, and by ejecting the liquid from the first nozzles based on the first print data and by ejecting the liquid from the second nozzles based on the second print data;
analyzing a degree of change in color values of the test pattern by acquiring a color measurement result of the printed test pattern; and
setting the mask that sets to the printer the first mask or a second mask which defines a correspondence relationship between each pixel position and one of the first nozzles and the second nozzles depending on the specific usage rate and of which a degree of the dispersion of the pixels corresponding to the second nozzles is higher than that of the first mask when it is determined that a predetermined constancy or more is provided in the change in the color values according to the analyzed result, and sets to the printer a third mask which defines the correspondence relationship between each pixel position and one of the first nozzles and the second nozzles depending on the specific usage rate and of which the degree of the dispersion of the pixels corresponding to the second nozzles is lower than that of the first mask when it is determined that a predetermined constancy or more is not provided in the change in the color values.

7. A print control device comprising:
a control section that controls a print head that includes a first nozzle column in which first nozzles ejecting liquid are arranged in a predetermined direction and a second nozzle column in which second nozzles ejecting the liquid are arranged in the predetermined direction and which is provided in a position deviated from the first nozzle column in the predetermined direction, and causes the liquid to be ejected onto a printing medium transported in the predetermined direction,
wherein the control section causes a first region that is expressed by the liquid ejected only by the first nozzles, a second region that is expressed by the liquid ejected from the first nozzles and the second nozzles depending on a first usage rate of the first nozzles and the second nozzles, and a third region that connects the first region and the second region, and is expressed by the liquid ejected from the first nozzles and the second nozzles depending on a second usage rate different from the first usage rate to be printed onto the printing medium,
wherein the second usage rate is a value that is obtained by increasing a usage rate of the second nozzles from a first region side to a second region side, and
wherein in the third region, the control section gradually increases the second usage rate of the second nozzles with respect to the first usage rate of first nozzles from the first region side of the third region to the second region side of the third region so that the proportion of the second usage rate of the second nozzles to the first usage rate of the first nozzles on the second region side of the third region is equivalent to the second usage rate of the second nozzles to the first usage rate of the first nozzles in the second region,
wherein the control section divides print data into the first print data corresponding to the first nozzles and the second print data corresponding to the second nozzles by applying the mask to the print data that expresses a predetermined test pattern and executes multiple times a process of printing the test pattern onto the printing medium by applying a plurality of masks in which degrees of the dispersion of the pixels corresponding to the second nozzles are different from each other by ejecting the liquid from the first nozzles based on the first print data and ejecting the liquid from the second nozzles based on the second print data, wherein the control section acquires a color measurement result of the test pattern that is printed for each of the test patterns in which the applied masks are different from each other and analyzes a degree of change in the color values for each of the test patterns, wherein the control section specifies the mask applied to the printing of the test pattern having a predetermined constancy or more applied to the change in the color value, based on a result of the analysis, and wherein the control section sets the specified mask as a mask that is used to print the third region.

\* \* \* \* \*